(12) United States Patent
Soyama et al.

(10) Patent No.: US 10,443,167 B2
(45) Date of Patent: Oct. 15, 2019

(54) METHOD FOR PRODUCING A WET-LAID NONWOVEN FABRIC

(71) Applicant: HOKUETSU CORPORATION, Nagaoka-shi (JP)

(72) Inventors: Toshihiko Soyama, Nagaoka (JP); Nobuyuki Sakadume, Tokyo (JP); Junji Nemoto, Nagaoka (JP)

(73) Assignee: HOKUETSU CORPORATION, Niigata (JP)

( * ) Notice: Subject to any disclaimer, the term of this patent is extended or adjusted under 35 U.S.C. 154(b) by 357 days.

(21) Appl. No.: 15/244,050

(22) Filed: Aug. 23, 2016

(65) Prior Publication Data

US 2016/0355961 A1 Dec. 8, 2016

Related U.S. Application Data

(62) Division of application No. 13/881,272, filed as application No. PCT/JP2011/079869 on Dec. 22, 2011, now abandoned.

(30) Foreign Application Priority Data

Dec. 27, 2010 (JP) ................ 2010-290728

(51) Int. Cl.
*D04H 1/732* (2012.01)
*B01D 69/10* (2006.01)
(Continued)

(52) U.S. Cl.
CPC .......... *D04H 1/732* (2013.01); *B01D 69/105* (2013.01); *D04H 1/04* (2013.01); *D04H 1/26* (2013.01);
(Continued)

(58) Field of Classification Search
USPC ................. 442/327, 164; 428/141; 162/206
See application file for complete search history.

(56) References Cited

U.S. PATENT DOCUMENTS 5,851,355 A 12/1998 Goettmann
2005/0006301 A1* 1/2005 Angelini ................ B01D 69/10
210/490

FOREIGN PATENT DOCUMENTS

GB 1595299 8/1981
JP 60-238103 A 11/1985
(Continued)

OTHER PUBLICATIONS

Notification of International Preliminary Report on Patentability dated Jul. 11, 2013 from corresponding International Application PCT/JP2011/079869; 10 pages.
(Continued)

*Primary Examiner* — Lynda Salvatore
(74) *Attorney, Agent, or Firm* — Ohlandt, Greeley, Ruggiero & Perle, L.L.P.

(57) ABSTRACT

A method for producing a wet-laid nonwoven fabric for a semipermeable membrane supporting body, the method comprising: performing papermaking according to a wet papermaking method by using a fiber slurry containing a synthetic fiber as a main constituent fiber; drying the fiber slurry; subsequently subjecting the dried sheet to hot press processing two times by using a heat calender apparatus, wherein the hot press process temperature in the second treatments is adjusted to be higher by 10° C. or more than the hot press processing temperature in the first treatment, while treating the dried sheet by using a hard nip heat calender apparatus equipped with a combination of a metal roll and a metal roll for at least one time of the hot press
(Continued)

processing; and thereby obtaining a wet-laid nonwoven fabric for a semipermeable membrane supporting body.

1 Claim, 3 Drawing Sheets

(51) Int. Cl.
| | |
|---|---|
| *D04H 1/04* | (2012.01) |
| *D04H 1/26* | (2012.01) |
| *D04H 1/4218* | (2012.01) |
| *D04H 1/541* | (2012.01) |
| *D04H 1/55* | (2012.01) |
| *D21H 13/10* | (2006.01) |
| *D21H 13/40* | (2006.01) |
| *D21H 17/53* | (2006.01) |
| *D21H 17/67* | (2006.01) |
| *D21H 13/24* | (2006.01) |
| *D21H 25/04* | (2006.01) |

(52) U.S. Cl.
CPC .......... *D04H 1/4218* (2013.01); *D04H 1/541* (2013.01); *D04H 1/55* (2013.01); *D21H 13/10* (2013.01); *D21H 13/24* (2013.01); *D21H 13/40* (2013.01); *D21H 17/53* (2013.01); *D21H 17/67* (2013.01); *D21H 25/04* (2013.01); *Y10T 442/60* (2015.04)

(56) References Cited

FOREIGN PATENT DOCUMENTS

| | | |
|---|---|---|
| JP | 7-155567 A | 6/1995 |
| JP | 10-225630 A | 8/1998 |
| JP | 2002-95937 A | 4/2002 |
| JP | 2008-238147 A | 10/2008 |
| JP | 2010-180080 A | 8/2010 |

OTHER PUBLICATIONS

International Search Report dated Mar. 6, 2012 from corresponding International Application PCT/JP2011/079869; 5 pages.
Extended European Search Report dated Oct. 5, 2016 from corresponding European Patent Application No. 11854090.5.

\* cited by examiner

METHOD FOR PRODUCING A WET-LAID NONWOVEN FABRIC

CROSS-REFERENCED APPLICATIONS

This application is a divisional application of U.S. patent application Ser. No. 13/881,272, now abandoned, which is incorporated herein in its entirety by reference thereto.

BACKGROUND

1. Field of the Disclosure

The present disclosure relates to a wet-laid nonwoven fabric, and more particularly, to a wet-laid nonwoven fabric for a semipermeable membrane supporting body, which serves as a supporting body for film formation in the production of a semipermeable membrane having a separative function, such as an ultrafiltration membrane, a microfiltration membrane, or a reverse osmotic (RO) membrane, reinforces a semipermeable membrane, does not cause strike through of the semipermeable membrane coating liquid at the time of film formation, and is intended to obtain a semipermeable membrane without any coating defects.

2. Discussion of the Background Art

In recent years, the applications where semipermeable membranes are applied are increasing continuously in the fields of the removal of impurities in beverages/industrial water, desalination of sea water, the removal of saprophytic bacteria in foods, and effluent treatment, or in the biochemical field. Furthermore, the research in these fields is in rapid progress both at home and abroad.

Regarding the material for a semipermeable membrane, various polymers such as regenerated cellulose, cellulose derivatives, polyvinyl alcohol, polysulfones, and polyamides are selected in accordance with the applications. However, the strength of the membrane itself is weak, and when used alone, the membrane cannot tolerate a high pressure such as 1 MPa to 10 MPa or higher, at which the membrane is used in ultrafiltration, reverse osmosis or the like. Thus, there is a need to produce a membrane on the surface of a supporting body such as a nonwoven fabric having a high strength and high liquid permeability.

In order to obtain the required liquid permeability, tensile strength, wet strength and durability, synthetic fiber nonwoven fabrics obtained by forming synthetic fibers of polyester, polyolefin or the like into a sheet form in a wet process or a dry process, and fusion bonding the fibers by subjecting the fibers to hot press processing, are generally used as the supporting body. There is a problem in that case, in which the non-uniformity of these nonwoven fabrics brings about non-uniformity of the semipermeable membrane provided thereon, and as a result, sufficient performance may not be obtained, or the film thickness required to obtain sufficient performance may be increased, resulting in a decrease in the filtration efficiency. Therefore, a nonwoven fabric to be used as a supporting body is required to be uniform as far as possible and to be free of pinhole defects or the like.

In regard to a nonwoven fabric as a semipermeable membrane supporting body, production methods thereof are conventionally known. For example, there has been suggested a method of promoting the prevention of strike through of a semipermeable membrane coating liquid while maintaining low resistance to liquid permeation, by fabricating a structure having coarseness and fineness in the Z direction by using polyester fibers having different fiber thicknesses (see, for example, Patent Document 1).

Furthermore, there has been suggested a method of providing a nonwoven fabric which has enhanced dimensional stability when tensile stress is applied, does not cause strike through, and exhibits excellent surface smoothness and excellent adhesiveness to membranes, by using a polyester fiber having a particular thermal shrinkage stress and a particular birefringence (see, for example, Patent Document 2).

Furthermore, it is said that bending of the supporting body in the width direction at the time of coating of a semipermeable membrane causes non-uniformity of the semipermeable membrane layer. Thus, it has been suggested to form a uniform semipermeable membrane layer by controlling the orientation of fibers (see, for example, Patent Document 3).

The inventors of the present disclosure have suggested an excellent semipermeable membrane supporting body, with which a semipermeable membrane that does not suffer strike through of the coating liquid when the semipermeable membrane is formed on the supporting body, and which is free of defects with the minimum thickness required, can be obtained by minimizing the non-uniformity of the mass of the sheet in the XY direction (see, for example, Patent Document 4).

Patent Document 1: Japanese Patent Application Laid-Open (JP-A) No. 60-238103
Patent Document 2: JP-A No. 10-225630
Patent Document 3: JP-A No. 2002-95937
Patent Document 4: JP-A No. 2008-238147

However, it has been found that even if the methods disclosed in Patent Documents 1 to 4 are carried out, there is a defect of semipermeable membrane supporting bodies that cannot be rectified. This defect exists in a local spot-like manner on a wet-laid nonwoven fabric sheet which is a semipermeable membrane supporting body. When a semipermeable membrane coating liquid is applied on this area, permeability of the liquid partially changes, and it becomes difficult for the liquid to permeate. Thereby, there occurs a problem of coating defects such as the thickness of the semipermeable membrane at this area becomes extremely thin, or the semipermeable membrane surface becomes wrinkled.

The inventors of the present disclosure conducted a thorough investigation on this problem, and as a result, the inventors found that this defect is associated with a decrease in the sheet density, with the synthetic fibers that constitute a wet-laid nonwoven fabric being in sparse state. Furthermore, it was found that when a semipermeable membrane coating liquid is applied to a site where this density is low (hereinafter, will be described as a "low density defect"), the permeability of the liquid is different from that of other sites so that coating defects occur.

There are various causes for the occurrence of low density defects. It was found that in many cases, low density defects are generated by the production process for a wet-laid nonwoven fabric for semipermeable membrane supporting body, particularly a heat calender that performs hot press processing of the wet-laid nonwoven fabric, or a hot pressing apparatus equivalent thereto. For instance, defects such as chips, dents and attached foreign materials of a heat calender roll, particularly a metal roll, cause inhibition of compression or temperature unevenness at the time of hot press processing, and thereby inhibit thermal fusion of synthetic fibers. Some of these defects can be visually detected, but there are some defects that may be overlooked and undetected because of being in the middle of production. Furthermore, these low density defects are not easily distinguishable from other normal areas even if a wet-laid nonwoven fabric thus produced is visually observed, and the low density defects cannot be easily detected. Therefore, unless a semipermeable membrane liquid is actually applied on a wet-laid nonwoven fabric, the low density defects cannot be detected, and accordingly, it has been laborious in view of product quality management. Actually, in many cases, manufacturers who produce wet-laid nonwoven fabrics for semipermeable membrane supporting bodies may not proceed to the process of applying a semipermeable membrane liquid. Therefore, it has been a huge loss for the manufacturers that the occurrence of low density defects cannot be detected, and defective products are generated in large quantities.

Particularly, when a wet-laid nonwoven fabric is used as a semipermeable membrane supporting body, low density defects are generated significantly. The reasons for this are that since the wet-laid nonwoven fabric uses cut fibers of synthetic fibers having a relatively shorter fiber length, the fibers can be easily arranged not only in a planar direction but also in the direction of sheet thickness, and the wet-laid nonwoven fabric before being subjected to hot press processing is prone to have a lower density and to be highly bulky, and that if there are factors inhibiting the thermal fusion described above at the time of hot press processing, these low density areas are likely to remain. On the other hand, when a dry-laid nonwoven fabric is used as a semipermeable membrane supporting body, if production methods such as melt blowing and spun bonding are used, continuous long fibers are used as the synthetic fiber, the fibers can be relatively easily arranged in a planar direction, while the dry-laid nonwoven fabric does not become highly bulky. Therefore, low density defects are not easily produced.

There is a demand for a production method in which low density defects that cause defects in the semipermeable membrane coating layer are detected in the stage of producing wet-laid nonwoven fabrics, and measures are taken, and which does not generate low density defects. Furthermore, there is a demand for a wet-laid nonwoven fabric for a semipermeable membrane supporting body that is free of low density defects.

Thus, it is an object of the present disclosure to provide a uniform semipermeable membrane supporting body which does not cause defects in the semipermeable membrane coating layer when a semipermeable membrane coating liquid is applied, and which is free of low density defects. It is another object of the disclosure to provide a method for detecting low density defects.

SUMMARY

According to the present disclosure, a wet-laid nonwoven fabric for a semipermeable membrane supporting body includes a synthetic fiber as a main constituent fiber and has been subjected to hot press processing, wherein the wet-laid nonwoven fabric for a semipermeable membrane supporting body has a pressure loss at a face velocity of 5.3 cm/second of from 50 Pa to 3000 Pa, and a sheet density of 0.5 g/cm$^3$ or greater, and satisfies the evaluation criterion of condition 1 or condition 2.

(Condition 1) Spots are not observed when solid printing is carried out with a printing ink over the entire surface of one surface of the wet-laid nonwoven fabric for a semipermeable membrane supporting body (rolled product, cut to a length of 1800 mm in the length direction).

(Condition 2) When a wet-laid nonwoven fabric for a semipermeable membrane supporting body that has been cut to a size of 210 mm×297 mm is subjected to solid printing over the entire surface of one surface with a printing ink, is used as a sample, spots are not observed in 95% or more of the samples among such samples thus extracted.

The wet-laid nonwoven fabric for a semipermeable membrane supporting body according to the present disclosure preferably further includes a binder fiber. Heating in a drying process after papermaking causes the surface to be fusion bonded, and an effect of imparting the sheet with a tensile strength that enables operation is obtained.

In the wet-laid nonwoven fabric for a semipermeable membrane supporting body according to the present disclosure, the nonwoven fabric has been preferably subjected to the hot press processing two or more times. The synthetic fibers at the low density defect areas can be made uniform by remelting the synthetic fibers.

In the wet-laid nonwoven fabric for a semipermeable membrane supporting body according to the present disclosure, the hot press processing temperature in the second and subsequent treatments is preferably higher by 10° C. or more than the hot press processing temperature in the first treatment. Remelting of the low density defects proceeds, and the occurrence of the low density defects is suppressed.

According to the present disclosure, a method for producing a wet-laid nonwoven fabric for a semipermeable membrane supporting body includes: performing papermaking according to a wet papermaking method by using a fiber slurry containing a synthetic fiber as a main constituent fiber; drying the fiber slurry; subsequently subjecting the dried sheet to hot press processing two or more times by using a heat calender apparatus, while treating the dried sheet by using a hard nip heat calender apparatus equipped with a combination of a metal roll and a metal roll for at least one time of the hot press processing; and thereby obtaining a wet-laid nonwoven fabric for a semipermeable membrane supporting body.

In the method for producing a wet-laid nonwoven fabric for a semipermeable membrane supporting body according to the present disclosure, the hot press process temperature in the second and subsequent treatments is preferably adjusted to be higher by 10° C. or more than the hot press processing temperature in the first treatment. Remelting of the low density defects can be made to progress, and as a result, the occurrence of the low density defects is suppressed.

In the method for producing a wet-laid nonwoven fabric for a semipermeable membrane supporting body according to the present disclosure, the hot press processing is preferably carried out two or more times by using a hard nip heat calender apparatus equipped with a combination of a metal roll and a metal roll. The occurrence of the low density defects can be further suppressed.

According to the present disclosure, in a method for identifying a low density defect in a wet-laid nonwoven fabric for a semipermeable membrane supporting body, the nonwoven fabric includes a synthetic fiber as a main constituent fiber and has been subjected to hot press processing. when the wet-laid nonwoven fabric for a semipermeable membrane supporting body satisfies the evaluation criterion of condition 1 or condition 2, it is determined that the nonwoven fabric has no low density defect; and when the wet-laid nonwoven fabric does not satisfy the evaluation criterion of condition 1 or condition 2, it is determined that the nonwoven fabric has a low density defect.

(Condition 1) Spots are not observed when solid printing is carried out with a printing ink over the entire surface of one surface of the wet-laid nonwoven fabric for a semipermeable membrane supporting body (rolled product, cut to a length of 1800 mm in the length direction).

(Condition 2) When a wet-laid nonwoven fabric for a semipermeable membrane supporting body that has been cut to a size of 210 mm×297 mm is subjected to solid printing over the entire surface of one surface with a printing ink, is used as a sample, spots are not observed in 95% or more of the samples among such samples thus extracted.

When the wet-laid nonwoven fabric for a semipermeable membrane supporting body of the present disclosure is used, a semipermeable membrane that does not have any coating defects caused by low density defects even after a coating treatment is carried out, is obtained. Furthermore, the presence or absence of the occurrence of low density defects can be easily confirmed.

DETAILED DESCRIPTION OF THE PREFERRED EMBODIMENT

Figure 1:
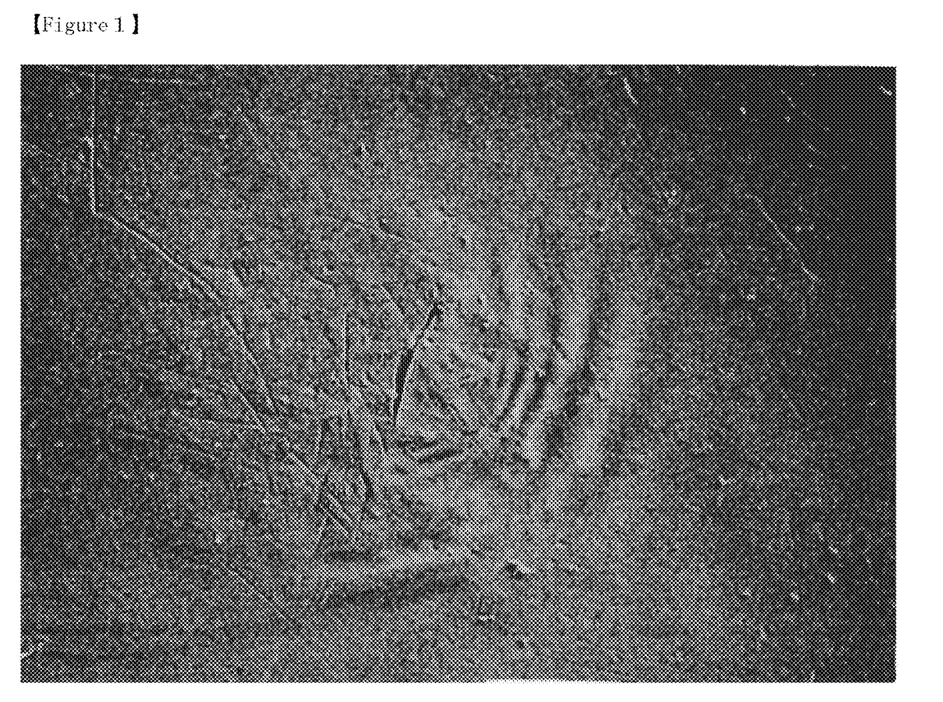
FIG. 1 is an electron microscopic photograph (magnification of 35 times) of the coating defects of a semipermeable membrane supporting body that has been coated with a semipermeable membrane.
Figure 2:
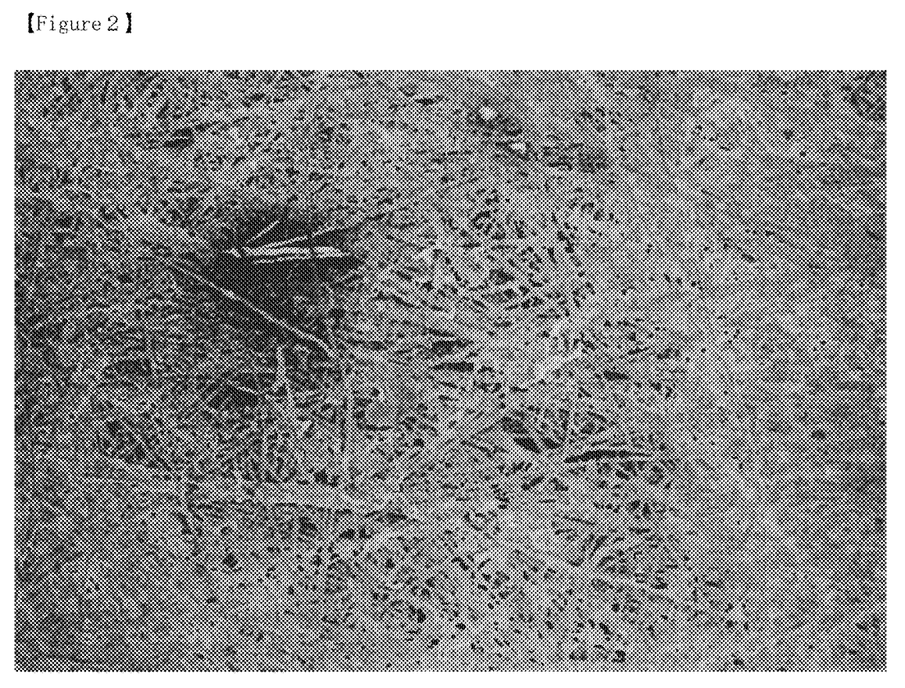
FIG. 2 is an electron microscopic photograph (magnification of 35 times) of low density defects of a semipermeable membrane supporting body.
Figure 3:
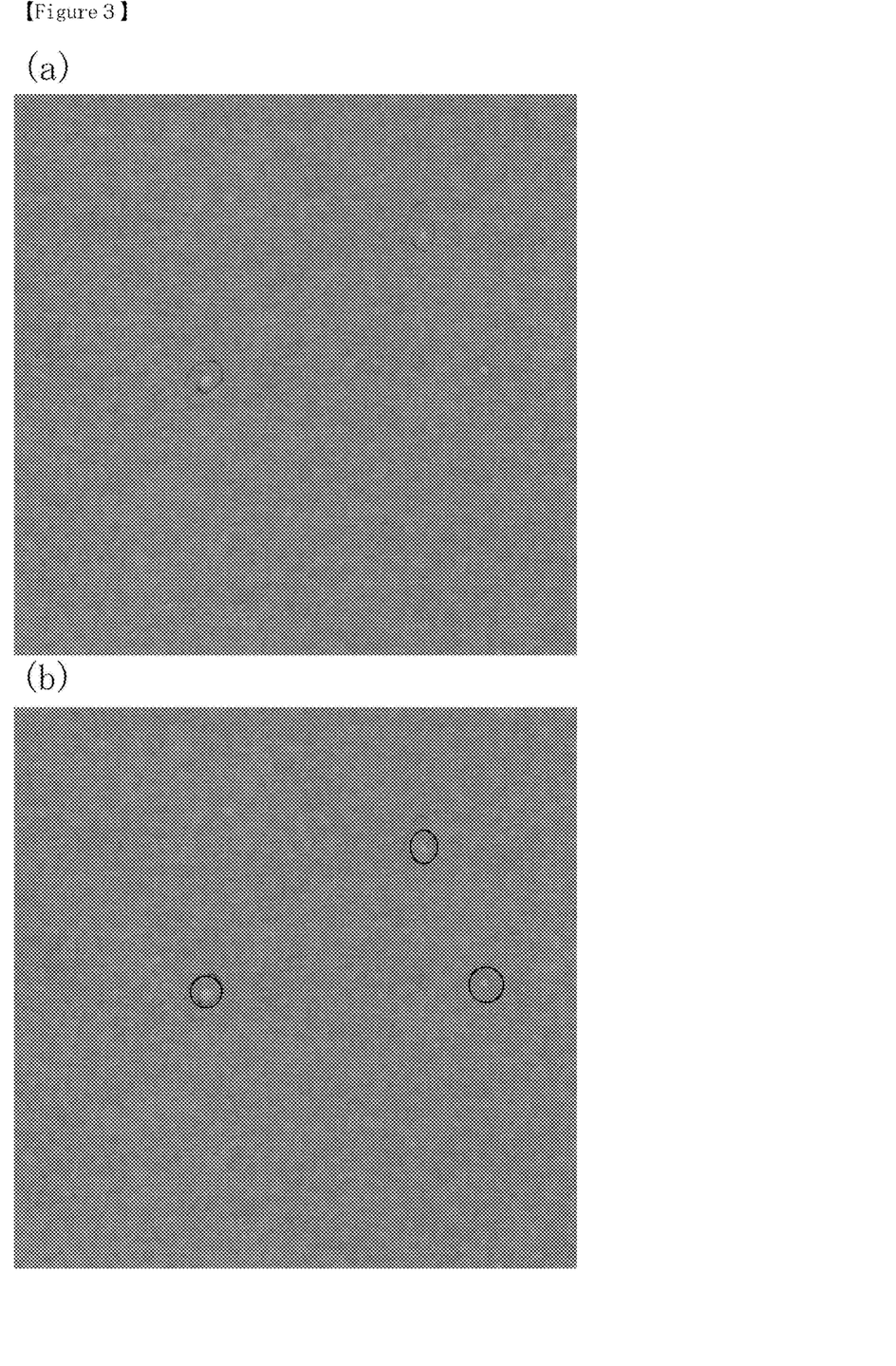
FIG. 3 is a photograph showing that spots caused by low density defects have been generated by solid printing over the entire surface of a semipermeable membrane supporting body by using an RI-3 type tester, while (a) is a photograph (partially marked with a handwritten circle), and (b) is a photograph in which the spots observed in the photograph of (a) are encircled to make the spots clearly obvious.

Hereinafter, the present disclosure will be described in detail by way of embodiments, but the present disclosure is not construed to be limited to these descriptions. So long as the effects of the present disclosure are provided, various modifications of the embodiments may be made.

The wet-laid nonwoven fabric for a semipermeable membrane supporting body according to the present embodiment is a wet-laid nonwoven fabric for a semipermeable membrane supporting body which contains a synthetic fiber as a main constituent fiber and has been subjected to hot press processing. The wet-laid nonwoven fabric for a semipermeable membrane supporting body has a pressure loss of from 50 Pa to 3000 Pa at a face velocity of 5.3 cm/second, has a sheet density of 0.5 g/cm$^3$ or greater, and satisfies the evaluation criterion of condition 1 or condition 2:

(Condition 1) Spots are not observed when solid printing is carried out with a printing ink over the entire surface of one surface of the wet-laid nonwoven fabric for a semipermeable membrane supporting body (rolled product, cut to a length of 1800 mm in the length direction); and (Condition 2) When a wet-laid nonwoven fabric for a semipermeable membrane supporting body that has been cut to a size of 210 mm×297 mm is subjected to solid printing over the entire surface of one surface with a printing ink, is used as a sample, spots are not observed in 95% or more of the samples among such samples thus extracted.

Examples of the synthetic fiber include fibers spun from synthetic resins such as polyethylene, polypropylene, polyacrylates, polyesters, polyurethanes, polyvinyl chloride, polyvinylidene chloride, polyethylene fluoride, polyaramids, polyimides, polyacrylonitrile, and nylon. Furthermore, regenerated cellulose such as rayon; cellulose derivatives such as cellulose acetate and nitrocellulose; synthetic resin pulps of polyethylene, polypropylene, acrylic resins, aramids and the like; or fibers obtained from raw material sources of natural materials, such as polylactic acid, polybutyric acid and polysuccinic acid, which have been a subject of active research for biochemical applications in recent years, are also included in the scope of the synthetic fiber. Among the synthetic fibers described above, polyester fibers are suitably used from the viewpoints of heat resistance, chemical resistance, low price, richness in the fiber diameter or the kind of characteristics, and the like. In the present disclosure, among the synthetic fibers, a synthetic fiber having an ordinary melting point that is not intended for fusion bonding at a low temperature, for example, a melting point of 140° C. to 300° C., is referred to as a main constituent fiber. Depending on the shape of the main constituent fiber, when a fiber having a fine fiber diameter is used, a completed sheet having a smaller pore size is obtained, while when a fiber having a coarse fiber diameter is used, a sheet having higher strength is obtained. When a short fiber is used, dispersibility in water is enhanced during a wet papermaking process, and when a long fiber is used, a sheet having higher strength is obtained. In the present embodiment, a synthetic fiber having a fiber thickness of 0.05 to 5.0 decitex and a length in the range of 1 to 8 mm is suitably used. Also, the shape of the cross-section of the fiber can be appropriately selected in accordance with the need, and is not intended to be limited in the present embodiment.

In the present embodiment, it is desirable that a binder fiber be incorporated into the wet-laid nonwoven fabric for a semipermeable membrane supporting body, in addition to the synthetic fiber that serves as the main constituent fiber, in order to obtain a sufficient sheet strength during a sheet-making process and a rolling process. The binder fiber generally refers to a synthetic fiber in which the entire fiber or the fiber surface (sheath part) has a melting point lower by about 20° C. or by 20° C. or more than that of the main constituent fiber. The binder fiber has an effect that the surface is fusion bonded by heating during a drying process after papermaking, and thus a tensile strength which enables operation is imparted to the sheet. However, since the tensile strength of the fiber itself is poorer than that of the main constituent fiber, it is necessary to employ an incorporation ratio which achieves a balance between the ease of operation and the physical strength of a completed product. In the present embodiment, the ratio of the main constituent fiber to the binder fiber is preferably in the range of 90:10 to 50:50. It is still possible to fusion bond the main constituent fibers without incorporating a binder fiber, by subjecting a sheet containing only the synthetic fiber that constitutes the main constituent fiber, to hot press processing. However, since the main constituent fiber is not intended for fusion bonding at a low temperature, it is necessary to raise the heating temperature during the hot press processing to a temperature near the melting point of the main constituent fiber. Thus, the main constituent fiber is incorporated in order to obtain physical strength (hereinafter, also simply described as "strength"), and the binder fiber is incorporated in order to facilitate fusion bonding between fibers at a low temperature.

Among the fibers that are incorporated, the incorporation ratio of the main constituent fiber (at this time, the binder fiber is not incorporated), or the total incorporation ratio of the main constituent fiber and the binder fiber is set to 50% by mass or greater, and preferably 70% by mass or greater, and these fibers serves as the main constituent fibers of the nonwoven fabric. At this time, if necessary, a pulp-like raw material, for example, wood pulp for papermaking or cellulosic pulp such as cotton linter; an inorganic fiber such as a glass fiber, a silica fiber, or an alumina fiber; or an inorganic filler material such as calcium carbonate, talc, or kaolin can also be incorporated in addition to the main constituent fiber, or the main constituent fiber and the binder fiber.

The binder fiber is available as a fiber in which the entirety of the constituent resin has a low melting point, or as a fiber having a double structure of an inner side and an outer side, namely, a so-called core-sheath structure, in which only the surface is fusion bonded, both of which can be used in the present embodiment. Suitably, a non-stretched polyester fiber having a melting point of about 200° C. to 230° C. is used. Furthermore, the fiber thickness, length, shape of the cross-section and the like can be selected according to the purpose, similarly to the main constituent fiber. It is preferable that the binder resin have a resin composition that is the same as the composition of the main constituent fiber or close to the composition of the main constituent; however, a different kind of resin composition can also be used in accordance with the required characteristics. Furthermore, a vinylon binder fiber having a characteristic of melting under hot humid conditions is also suitably used. Moreover, wood pulp for papermaking having self-adhesiveness based on hydrogen bonding can also be used as a binder.

In order to obtain satisfactory coating suitability of the semipermeable membrane coating liquid to a wet-laid nonwoven fabric, it is needed to reduce air permeability by increasing the sheet density of the wet-laid nonwoven fabric that serves as a base material. The sheet density obtainable after the hot press processing is preferably 0.5 g/cm$^3$ or greater, more preferably 0.6 g/cm$^3$ or greater, and most preferably 0.7 g/cm$^3$ or greater. If the sheet density is less than 0.5 g/cm$^3$, the semipermeable membrane coating liquid penetrates too deeply into the sheet of the wet-laid nonwoven fabric, and the surface of the semipermeable membrane coating layer becomes irregular. Since the wet-laid nonwoven fabric for a semipermeable membrane supporting body is such that the sheet density is increased to a very high value by using a hot pressing apparatus that will be described below so as to enhance the sheet strength, the wet-laid nonwoven fabric tends to have low density defects generated easily, as compared with other bulky wet-laid nonwoven fabrics.

The air permeability of the wet-laid nonwoven fabric after being subjected to hot press processing is preferably from 50 Pa to 3000 Pa, and more preferably from 80 Pa to 1500 Pa, as a pressure loss of the wet-laid nonwoven fabric at a face velocity of 5.3 cm/second. Here, the pressure loss is an index denoting the air permeability of the wet-laid nonwoven fabric, and a higher pressure loss implies lower air permeability. If the pressure loss is less than 50 Pa, as described previously, the semipermeable membrane coating liquid penetrates too deeply into the sheet of the wet-laid nonwoven fabric, and the surface of the semipermeable membrane coating layer becomes irregular. Furthermore, if the pressure loss is larger than 3000 Pa, on the contrary, it is difficult for the semipermeable membrane coating liquid to penetrate into the interior of the sheet of the wet-laid nonwoven fabric, so that the attachment of the semipermeable membrane coating layer to the surface of the wet-laid nonwoven fabric deteriorates, and the semipermeable membrane coating layer may be easily detached from the wet-laid nonwoven fabric.

In consideration of the strength of the wet-laid nonwoven fabric, coatability of the semipermeable membrane coating liquid, and adhesiveness of the semipermeable membrane coating layer that are required, the pressure loss of the wet-laid nonwoven fabric for a semipermeable membrane supporting body after being subjected to hot press processing at a face velocity of 5.3 cm/second is set to from 50 Pa to 3000 Pa, and the sheet density is set to 0.5 g/cm$^3$ or greater. Furthermore, the basis weight of the wet-laid nonwoven fabric is preferably 30 to 200 g/m$^2$, and more preferably 50 to 150 g/m$^2$. If the basis weight of the wet-laid nonwoven fabric is larger than 200 g/m$^2$, when a semipermeable membrane thus produced is fabricated into modules, the membrane becomes so thick that the area per module becomes small, and the filtration performance deteriorates. If the basis weight is less than 30 g/m$^2$, the thickness becomes too thin, and there is a risk that strike through of the semipermeable membrane coating liquid may occur during the film forming process. Furthermore, the thickness of the wet-laid nonwoven fabric is preferably 30 μm to 400 μm, and more preferably 55 μm to 300 μm. If the thickness of the wet-laid nonwoven fabric is larger than 400 μm, when a semipermeable membrane thus produced is fabricated into modules, the membrane becomes so thick that the area per module becomes small, and the filtration performance deteriorates. If the thickness is less than 30 μm, the thickness becomes too thin, and there is a risk that strike through of the semipermeable membrane coating liquid may occur during the film forming process.

Regarding the method for producing a wet-laid nonwoven fabric for a semipermeable membrane, in a production process for a filter material, a so-called wet papermaking method is used, in which fibers are dispersed in water, subsequently the fibers are laminated on a papermaking wire, and the fibers are dehydrated from the lower side of the wire to form a sheet. The kind of the papermaking machine used at this time is not limited in the present embodiment, and for example, a single substrate type papermaking apparatus, or in the case of a continuous papermaking apparatus, a long wire paper machine, a short wire paper machine, a cylinder wire paper machine, an inclined wire paper machine, a gap former, a delta former and the like can be used. In this case, in order to obtain a wet-laid nonwoven fabric for a semipermeable membrane supporting body having fewer defects, it is desirable to perform sheet-making uniformly as far as possible, with a good fabric quality.

Since the sheet thus made contains a large amount of water, the sheet is dried in a drying zone. There are no particular limitations on the drying method to be used at this time, but hot air drying, infrared drying, drum drying, drying by a yankee dryer, and the like are suitably used. The drying temperature is preferably 100° C. to 160° C., and more preferably 105° C. to 140° C.

A wet-laid nonwoven fabric obtained after the sheet-making process and the drying process has insufficient strength to be used directly as a semipermeable membrane supporting body. Thus, in order to obtain sufficient strength as a semipermeable membrane supporting body, the strength is increased by fusion bonding the main constituent fiber by subjecting the wet-laid nonwoven fabric to hot press processing at a temperature close to the melting point of the main constituent fiber. Various hot press processing apparatuses are used for this treatment, but generally, a heat calender apparatus is effective. For example, a method of using a metal roll nip calender capable of processing at a temperature of 160° C. or higher can be used, or if a resin roll having high heat resistance is available, a soft nip calender equipped with a combination of a metal roll and a resin roll can also be used. The temperature conditions, pressure conditions, and sheet tension employed at this time may affect the performance of the completed supporting body, but any conditions that do not impair the requirements of the present disclosure can be employed. The temperature condition for the hot press processing is generally preferably in the range of 160° C. to 260° C., and more preferably in the range of 180° C. to 240° C.; however, depending on the kind of the synthetic fiber to be used, there are occasions in which a lower temperature or a higher temperature is desirable. For example, in the case of incorporating a binder fiber into the main constituent fiber, the fibers are fusion bonded by subjecting the fibers to hot press processing at a temperature close to the melting point of the binder fiber, and thereby the strength is increased. The linear pressure is preferably in the range of 50 to 250 kN/m, and more preferably in the range of 100 to 200 kN/m, but there are no limitations thereon. Furthermore, in order to allow the entire web to exhibit uniform performance, it is desirable to treat with a temperature profile and a linear pressure profile that are as uniform as possible. The roll diameter of the heat calender apparatus is appropriately selected on the basis of the base material to be hot press processed, and parameters such as nip pressure and speed. If only the main constituent fiber is used without having a binder fiber incorporated therein, the wet-laid nonwoven fabric is subjected to hot press processing at a temperature close to the melting point of the main constituent fiber.

As described above, these hot press processing apparatuses are very highly effective in the production of semipermeable membrane supporting bodies. However, if there are chips, dents, attachment of foreign materials and the like on the hot-pressed surface, these cause temperature unevenness at the time of hot press processing, and inhibit thermal fusion of the synthetic fibers that constitute the sheet. Therefore, these may cause generation of low density defects. These low density defects are not recognized even if a wet-laid nonwoven fabric thus produced is visually inspected, and the low density defects are recognizable by observing the coarseness and fineness of the fibers under a microscope. However, it is impossible to observe the entirety of a wet-laid nonwoven fabric having a large area with a microscope, and coating defects can be visually recognized only after the subsequent process of performing the coating treatment of the semipermeable membrane liquid.

The inventors of the present disclosure conducted a thorough investigation on this problem, and as a result, they found that if solid printing is carried out over the entire surface of a wet-laid nonwoven fabric that has been subjected to hot press processing by using a printing ink, a "spot" where the printing ink does not easily adhere may occur, and this spot is the same site as that of a low density defect. Regarding the printing method, printing methods such as inkjet printing, screen printing, offset printing, and letterpress printing can be appropriately used, and the printing ink is also appropriately selected. Among these, in the case of inkjet printing, the printing machine is easily available at relatively low cost, and since small-sized printers as well as large-sized broad-width printers are available, it is possible to perform solid printing of a relatively large area continuously. Meanwhile, if the main constituent fiber that constitutes the wet-laid nonwoven fabric is white in color, the color of the wet-laid nonwoven fabric itself becomes white, and in this case, the spot exhibits the color of the substrate (wet-laid nonwoven fabric) and is observed as a "white spot".

Regarding the reason why the spot coincides with the low density defect, it is speculated to be because since the low density low-density defect has a fiber configuration with a lower density and has a larger pore diameter as compared with other normal areas, it is difficult for the capillary phenomenon to operate as compared with other normal areas, and the ink printed on the wet-laid nonwoven fabric is not easily absorbed at the surface of the nonwoven fabric.

By inspecting the presence of any spot, various causes in the production process for the wet-laid nonwoven fabric or the like can be identified, and thereby, the low density defect can be rectified. For example, in regard to the chips, dents, attachment of foreign materials and the like of a heat calender for hot press processing, since the heat calender is a cylindrical body, spots are generated periodically at a length of the circumference of the heat roll. That is, when the period of the spot occurrence is examined, it can be recognized that the heat calender is the cause, and the site of occurrence can be determined. Next, if the site of occurrence can be determined, appropriate measures can be taken, and thereby, a semipermeable membrane supporting body which is free of low density defects that lead to the occurrence of coating defects can be obtained.

On the other hand, it was found that the low density defects can be rectified by changing the method for hot press processing. That is, the synthetic fiber at a low density defect area is remelted to be made uniform by performing the hot press processing two or more times. For example, when the wet-laid nonwoven fabric is treated with a heat calender having chips on the heat roll surface, low density defects are generated in a first treatment. However, if a second treatment is carried out by using the same heat calender, the probability of a roll chip contact-pressing again at the low density defect area is very low, and the normal surface of the roll contact-presses the low density defect area. Therefore, the synthetic fiber at the low density defect area can be remelted. At this time, even if the roll chip area of the heat calender is brought into contact with the sheet, since the synthetic fiber at this site has already been melted, there is no chance of the occurrence of low density defect at this site.

Multiple treatment of the hot press processing may be carried out by repeatedly using the same hot pressing apparatus in the first treatment and in the second and subsequent treatments, and a method of continuously performing the treatment by arranging plural hot pressing apparatuses, or a calender apparatus in which heat calender rolls are disposed in multiple stages along the height direction can also be employed. Regarding the treatment temperature in the first treatment and in the second and subsequent treatments, in order to allow remelting of the low density defects to proceed, it is preferable to set the treatment temperature in the second and subsequent treatments to be equal to or higher than the treatment temperature in the first treatment.

When the treatment temperature in the second and subsequent treatments is set to be higher than the treatment temperature in the first treatment, the hot press processing temperature in the second and subsequent treatments is preferably set to be higher by 10° C. or more, more preferably to be higher by 13° C. or more, and even more preferably to be higher by 15° C. or more, than the hot press processing temperature in the first treatment. However, the upper limit of the temperature difference is preferably adjusted up to 70° C.

In the method for performing the treatment continuously by arranging plural hot pressing apparatuses as described above, it is preferable to dispose at least one, and more preferably two or more, of a hard nip calender equipped with a combination of a metal roll and a metal roll. When only a soft nip calender equipped with a combination of a metal roll and a resin roll is used, the effect of remelting the fibers is weak, and thus, the problem of low density defects is not solved. If hot press processing is carried out at least one time with a hard nip calender, since fiber melting has progressed to a certain extent by the hard nip effect, the problem of low density defects can be sufficiently solved even with a combination with a soft nip calender.

Furthermore, when a heat calender apparatus in which heat calender rolls are arranged in multiple stages along the height direction has three stages, if the second roll is a metal roll, and there is a defect on the roll surface, the defect area remains in contact at the same site of the sheet until the end of the hot press processing. Therefore, the problem of low density defects cannot be solved, and it is not preferable. In this case, if multiple stages of four or more stages are used, the problem of low density defects can be solved.

Meanwhile, the phrase "free of spots" as used herein means that the evaluation criterion of the following condition 1 or condition 2 is satisfied:

(Condition 1) Spots are not observed when solid printing is carried out with a printing ink over the entire surface of one surface of the wet-laid nonwoven fabric for a semipermeable membrane supporting body (rolled product, cut to a length of 1800 mm in the length direction); and (Condition 2) When a wet-laid nonwoven fabric for a semipermeable membrane supporting body that has been cut to a size of 210 mm×297 mm is subjected to solid printing over the entire surface of one surface with a printing ink, is used as a sample, spots are not observed in 95% or more of the samples among such samples thus extracted.

In the case of the condition 1, an instance of a rolled product is contemplated. If the circumferential length of the heat roll of the heat pressing apparatus is 1800 mm or less, one period of the heat roll is included therein, and it is checked that not even one spot is present in that range. In this case, the wet-laid nonwoven fabric for a semipermeable membrane supporting body is cut and divided into an arbitrary size (for example, 300 mm×300 mm, or 210 mm×297 mm), subsequently solid printing is carried out over the entire surface of one surface with a printing ink, and observation may be carried out.

In the case of the condition 2, a partially cut product of a rolled product, a broad-width rolled product (a rolled product having a width such that printing over the entire surface cannot be carried out properly), or a sample product cut to a size such as the A4 size is contemplated. This is an instance in which an evaluation of whole-surface solid printing is carried out with a sample cut to a size of 210 mm×297 mm, and as a result, no spot is observed in 95% or more of the samples among such samples thus extracted. When no spot is observed in 95% or more of the samples, it can be speculated that it is substantially equivalent to the situation in which the occurrence of spots is not observed in one period of the heat roll at the time of production.

The surface to be coated with a semipermeable membrane may be any surface of the supporting body, but it is preferable to apply a semipermeable membrane on the surface where whole-surface solid printing is carried out. When a printing ink is selected as the coating liquid for semipermeable membrane, and there is a difference in the penetrability of the ink, that is, when spots are detected, it can be predicted that the difference in the penetrability of the coating liquid for semipermeable membrane is also easily recognizable. Meanwhile, when a sheet in which spots have been detected by carrying out solid printing over the entire surface of one surface thereof, is subjected to solid printing over the entire surface of the reverse surface, similarly spots are detected in most cases.

EXAMPLES

Next, the present disclosure will be more specifically described by way of Examples, but the present disclosure is not intended to be limited to these Examples.

Example 1

<Preparation of Fiber Raw Material Slurry>

Twenty four kg of a commercially available polyester main constituent fiber (product name: EP133, manufactured by Kuraray Co., Ltd.) having a thickness of 1.45 decitex and a cut length of 5 mm, and 6 kg of a commercially available polyester binder fiber (product name: TR07N, manufactured by Teijin Fibers, Ltd.) having a thickness of 1.2 decitex and a cut length of 5 mm were introduced in 2970 kg of water, and the fibers were dispersed therein for 5 minutes by using a dispersing machine. Thus, a fiber raw material slurry having a fiber component concentration of 1% by mass was obtained.

<Preparation of Fiber Slurry>

Water was added to the fiber raw material slurry 1 to dilute the entirety, and thus a fiber slurry having a fiber component concentration of 0.03% by mass was obtained.

<Production of Sheet>

This fiber slurry was introduced into a head box of a short wire paper machine, and the fiber slurry was subjected to papermaking. Subsequently, the fiber slurry was dried with a cylinder dryer at a surface temperature of 120° C. until the sheet was completely dried, and the wet-laid nonwoven fabric sheet was wound into a roll having a width of 900 mm. This was designated as a nonwoven fabric roll A. When visually inspected, no low density defect was detected.

<Hot Press Processing>

The foregoing nonwoven fabric roll A was subjected to hot press processing under the conditions of a roll surface temperature of 180° C., a clearance between rolls of 80 µm, a linear pressure of 90 kN/m, and a throughput speed of 5 m/min, by using a heat calender apparatus equipped with a hard nip with a combination of a metal roll and a metal roll, having a face length of the metal roll of 1170 mm and a roll diameter of 450 mm (circumferential length: 1413 mm). Thus, a wet-laid nonwoven fabric A for a semipermeable membrane supporting body having a basis weight of 76 $g/m^2$, a thickness of 95 µm, a sheet density of 0.80 $g/cm^3$, and a pressure loss of 370 Pa was obtained. Furthermore, the papermaking machine and the heat calender apparatus were inspected after the production of the wet-laid nonwoven fabric, but any defect that causes a low density defect was not detected.

<Solid Printing Evaluation 1>

A specimen having a width of 900 mm and a length of 1800 mm was collected from the foregoing wet-laid nonwoven fabric A for a semipermeable membrane supporting body, and this specimen was divided into 18 pieces having a size of a width of 300 mm and a length of 300 mm. Each of these sheets was subjected to solid printing by using an RI-3 type tester (manufactured by Akira Seisakusho Co., Ltd.) and using 0.6 ml of a commercially available offset printing ink, NOUVEL MAXI AF magenta (manufactured by Dainichiseika Color & Chemicals Manufacturing Co., Ltd.), according to a method equivalent to the simple color spread method described in JIS K 5701-1:2000 "Planographic Ink—Part 1: Testing methods". Meanwhile, the printing pressure of the rubber roller used at this time was adjusted to 8 mm. As a result, no spot was detected in all of the 18 sheets.

<Solid Printing Evaluation 2>

A specimen having a width of 900 mm and a length of 1800 mm was collected from the foregoing wet-laid nonwoven fabric A for a semipermeable membrane supporting body, and this was directly subjected to whole-surface solid printing by using a broad-width inkjet plotter, Master Jet JC2008 (manufactured by Graphtec Corp.) and using genuine inkjet dye inks GA (cyan, magenta, yellow, and black; manufactured by Encad, Inc.). The printing conditions were set by Microsoft (registered trademark) Word, and the color was set to sky blue color. As a result, no spot was detected.

<Coating Evaluation>

A specimen having a width of 900 mm and a length of 1800 mm was collected from the foregoing wet-laid nonwoven fabric A for a semipermeable membrane supporting body, and this specimen was divided into 18 pieces having a size of a width of 300 mm and a length of 300 mm. For each of these pieces, a 20% by mass DMF (dimethylformamide) solution of a polysulfone resin was applied on the semipermeable membrane supporting body by using a Meyer bar #12, and then the coating layer was solidified by immersing the piece in water, to thereby form a semipermeable membrane. An observation (visual observation) of the surface of the semipermeable membrane, and an observation by light transmission (visual observation) about the thickness of the semipermeable membrane were carried out, and as a result, no coating defect was detected in all of the 18 sheets.

<Conclusions>

The wet-laid nonwoven fabric for a semipermeable membrane supporting body thus obtained satisfied the condition 1 or the condition 2, and was determined to be free of problems at a practical level. Also, it was confirmed that the wet-laid nonwoven fabric for a semipermeable membrane supporting body had no low density defect.

Example 2

<Hot Press Processing>

One upper roll between the two metal rolls of the heat calender used in Example 1 was replaced with a metal roll having a depression with a diameter of about 1 mm and a depth of about 0.6 mm at one site on the roll surface, and the nonwoven fabric roll A of Example 1 was subjected to hot press processing under the same conditions as those in Example 1. Thus, a wet-laid nonwoven fabric B for a semipermeable membrane supporting body having a basis weight of 76 g/m$^2$, a thickness of 94 μm, a sheet density of 0.81 g/cm$^3$, and a pressure loss of 390 Pa was obtained. No low density defect was recognized by visual inspection.

<Solid Printing Evaluation 1>

A specimen having a width of 900 mm and a length of 1800 mm was collected from the foregoing wet-laid nonwoven fabric B for a semipermeable membrane supporting body, and this specimen was divided into 18 pieces having a size of a width of 300 mm and a length of 300 mm. Each of these was subjected to solid printing by using the same RI tester and the same printing ink as those used in Example 1. As a result, two spots were detected from the 18 sheets.

Here, two sheets each having one spot were detected. Regarding the spots, the two spots were all at the same positions in the sheet width direction before being divided, and the distance between the two spots in the sheet length direction before being divided was 1410 mm, which almost coincided with the circumference of the calender roll.

<Solid Printing Evaluation 2>

A specimen having a width of 900 mm and a length of 1800 mm was collected from the foregoing wet-laid nonwoven fabric B for a semipermeable membrane supporting body, and this specimen was directly subjected to solid printing with the same inkjet printer as that used in Example 1. As a result, two spots were detected in the sheet. Regarding the spots, the two spots were all at the same positions in the sheet width direction, and the distance in the sheet length direction was 1410 mm, which almost coincided with the circumference of the calender roll. Furthermore, the position of the depression in the width direction of the calender roll coincided with the position of the spot in the sheet width direction.

<Coating Evaluation>

A specimen having a width of 900 mm and a length of 1800 mm was collected from the foregoing wet-laid nonwoven fabric B for a semipermeable membrane supporting body, and this specimen was divided into 18 pieces having a size of a width of 300 mm and a length of 300 mm. For each of these, a semipermeable membrane was formed thereon by the same method as that used in Example 1. An observation of the surface of the semipermeable membrane and an observation by light transmission about the thickness of the semipermeable membrane were carried out, and as a result, a coating defect of having a thinner coating layer was detected in two of the 18 sheets at the same position in the sheet width direction. The position of the depression in the width direction of the calender roll coincided with the position of the coating defect in the sheet width direction before being divided, and the distance in the sheet length direction was 1415 mm, which almost coincided with the circumference of the calender roll. Furthermore, the semipermeable membrane was peeled off, and normal areas and coating defect areas were observed under an electron microscope. As a result, it was observed that dissolution of the synthetic fiber was poorer in the coating defect areas than in the normal areas. Thus, it was confirmed that these areas corresponded to the low density defects.

<Conclusions>

The wet-laid nonwoven fabric for a semipermeable membrane supporting body thus obtained did not satisfy the condition 1 or the condition 2, and therefore, the nonwoven fabric was determined to have problems at a practical level. It was confirmed that the wet-laid nonwoven fabric for a semipermeable membrane supporting body had low density defects.

Example 3

<Hot Press Processing>

The nonwoven fabric roll A of Example 1 was subjected to hot press processing under the same conditions as those in Example 1, by using the heat calender apparatus having a chipped metal roll used in Example 2. Thus, a wound roll having a basis weight of 75 g/m$^2$, a thickness of 94 μm, a sheet density of 0.80 g/cm$^3$, and a pressure loss of 370 Pa was obtained. Next, this wound roll was subjected to hot press processing again under the same conditions as those in Example 1 by using the same heat calender apparatus, and thus a wet-laid nonwoven fabric C for a semipermeable membrane supporting body having a basis weight of 77 g/m², a thickness of 94 μm, a sheet density of 0.82 g/cm³, and a pressure loss of 400 Pa was obtained. When visually inspected, no low density defect was detected.

<Solid Printing Evaluation 1>

A specimen having a width of 900 mm and a length of 1800 mm was collected from the foregoing wet-laid nonwoven fabric C for a semipermeable membrane supporting body, and this specimen was divided into 18 pieces having a size of a width of 300 mm and a length of 300 mm. Each of these was subjected to solid printing by using an RI tester and a printing ink. As a result, no spot was detected in all of the 18 sheets.

<Solid Printing Evaluation 2>

A specimen having a width of 900 mm and a length of 1800 mm was collected from the foregoing wet-laid nonwoven fabric C for a semipermeable membrane supporting body, and this specimen was directly subjected to solid printing with an inkjet printer. As a result, no spot was detected.

<Coating Evaluation>

A specimen having a width of 900 mm and a length of 1800 mm was collected from the foregoing wet-laid nonwoven fabric C for a semipermeable membrane supporting body, and this specimen was divided into 18 pieces having a size of a width of 300 mm and a length of 300 mm. For each of these, a semipermeable membrane was formed thereon under the same conditions as those in Example 1. An observation of the surface of the semipermeable membrane and an observation by light transmission about the thickness of the semipermeable membrane were carried out, and as a result, no coating defect was detected.

<Conclusions>

The wet-laid nonwoven fabric for a semipermeable membrane supporting body thus obtained satisfied the condition 1 or the condition 2, and was determined to be free of problems at a practical level. Furthermore, it was confirmed that the wet-laid nonwoven fabric for a semipermeable membrane supporting body had no low density defect.

Example 4

<Preparation of Fiber Raw Material Slurry>

Twenty nine kg of a commercially available polyester main constituent fiber (product name: EP133, manufactured by Kuraray Co., Ltd.) having a fiber thickness of 1.45 decitex and a cut length of 5 mm was introduced into 2970 kg of water, and the fiber was dispersed therein for 5 minutes with a dispersing machine. Thus, a fiber raw material slurry having a fiber component concentration of 1% by mass was obtained.

<Preparation of Fiber Slurry>

Water was added to the fiber raw material slurry 1 to dilute the entirety, and thus a fiber slurry having a fiber component concentration of 0.03% by mass was obtained.

<Production of Sheet>

This fiber slurry was introduced into a head box of a short wire paper machine, and the fiber slurry was subjected to papermaking. Subsequently, the fiber slurry was dried with a cylinder dryer at a surface temperature of 120° C. until the sheet was completely dried, and the wet-laid nonwoven fabric sheet was wound on a roll having a width of 900 mm. This was designated as a nonwoven fabric roll D. When visually inspected, no low density defect was detected.

<Hot Press Processing>

The foregoing nonwoven fabric roll D was subjected to hot press processing under the conditions of a roll surface temperature of 250° C., a clearance between rolls of 60 μm, a linear pressure of 90 kN/m, and a throughput speed of 5 m/min, by using a heat calender apparatus equipped with a hard nip with a combination of a metal roll and a metal roll, having a face length of the metal roll of 1170 mm and a roll diameter of 450 mm (circumferential length: 1413 mm). Thus, a wet-laid nonwoven fabric D for a semipermeable membrane supporting body having a basis weight of 72 g/m², a thickness of 100 μm, a sheet density of 0.72 g/cm³, and a pressure loss of 120 Pa was obtained. Furthermore, the papermaking machine and the heat calender apparatus were inspected after the production of the wet-laid nonwoven fabric, but any defect that causes a low density defect was not detected.

<Solid Printing Evaluation 1>

A specimen having a width of 900 mm and a length of 1800 mm was collected from the foregoing wet-laid nonwoven fabric D for a semipermeable membrane supporting body, and this specimen was divided into 18 pieces having a size of a width of 300 mm and a length of 300 mm. Each of these sheets was subjected to solid printing by using an RI-3 type tester (manufactured by Akira Seisakusho Co., Ltd.) and using 0.6 ml of a commercially available offset printing ink, NOUVEL MAXI AF magenta (manufactured by Dainichiseika Color & Chemicals Manufacturing Co., Ltd.), according to a method equivalent to the simple color spread method described in JIS K 5701-1:2000. Meanwhile, the printing pressure of the rubber roller used at this time was adjusted to 8 mm. As a result, no spot was detected in all of the 18 sheets.

<Solid Printing Evaluation 2>

A specimen having a width of 900 mm and a length of 1800 mm was collected from the foregoing wet-laid nonwoven fabric D for a semipermeable membrane supporting body, and this was directly subjected to whole-surface solid printing by using a broad-width inkjet plotter, Master Jet JC2008 (manufactured by Graphtec Corp.) and using genuine inkjet dye inks GA (cyan, magenta, yellow, and black; manufactured by Encad, Inc.). The printing conditions were set by Microsoft (registered trademark) Word, and the color was set to sky blue color. As a result, no spot was detected.

<Coating Evaluation>

A specimen having a width of 900 mm and a length of 1800 mm was collected from the foregoing wet-laid nonwoven fabric D for a semipermeable membrane supporting body, and this specimen was divided into 18 pieces having a size of a width of 300 mm and a length of 300 mm. For each of these pieces, a 20% by mass DMF (dimethylformamide) solution of a polysulfone resin was applied on the semipermeable membrane supporting body by using a Meyer bar #12, and then the coating layer was solidified by immersing the piece in water, to thereby form a semipermeable membrane. An observation of the surface of the semipermeable membrane, and an observation by light transmission about the thickness of the semipermeable membrane were carried out, and as a result, no coating defect was detected in all of the 18 sheets.

<Conclusions>

The wet-laid nonwoven fabric for a semipermeable membrane supporting body thus obtained satisfied the condition 1 or the condition 2, and was determined to be free of problems at a practical level. Furthermore, it was confirmed that the wet-laid nonwoven fabric for a semipermeable membrane supporting body had no low density defect.

Example 5

<Hot Press Processing>

The nonwoven fabric roll A of Example 1 was subjected to hot press processing under the same conditions as those in Example 1, by using the heat calender apparatus having a chipped metal roll used in Example 2. Thus, a wound roll having a basis weight of 74 g/m², a thickness of 93 μm, a sheet density of 0.80 g/cm³, and a pressure loss of 350 Pa was obtained. Next, this wound roll was subjected to hot press processing under the conditions of a roll surface temperature of 190° C., which was higher by 10° C. than the hot pressing temperature of the first treatment, a clearance between rolls of 0 μm, a linear pressure of 150 kN/m, and a throughput speed of 5 m/min, by using a heat calender apparatus equipped with a soft nip with a combination of a metal roll and a cotton roll, having a face length of 1170 mm and a roll diameter of 450 mm (circumferential length: 1413 mm) for the metal roll, and a face length of 1170 mm and a roll diameter of 400 mm (circumferential length: 1256 mm) for the cotton roll. Thus, a wet-laid nonwoven fabric E for a semipermeable membrane supporting body having a basis weight of 76 g/m², a thickness of 92 μm, a sheet density of 0.83 g/cm³, and a pressure loss of 410 Pa was obtained. When visually inspected, no low density defect was detected.

<Solid Printing Evaluation 1>

A specimen having a width of 900 mm and a length of 1800 mm was collected from the foregoing wet-laid nonwoven fabric E for a semipermeable membrane supporting body, and this specimen was divided into 18 pieces having a size of a width of 300 mm and a length of 300 mm. Each of these was subjected to solid printing by using an RI tester and a printing ink. As a result, the trace of a white spot was detected in one sheet out of the 18 sheets. One spot was detected in one sheet.

<Solid Printing Evaluation 2>

A specimen having a width of 900 mm and a length of 1800 mm was collected from the foregoing wet-laid nonwoven fabric E for a semipermeable membrane supporting body, and this specimen was directly subjected to solid printing with an inkjet printer. As a result, no spot was detected.

<Coating Evaluation>

A specimen having a width of 900 mm and a length of 1800 mm was collected from the foregoing wet-laid nonwoven fabric E for a semipermeable membrane supporting body, and this specimen was divided into 18 pieces having a size of a width of 300 mm and a length of 300 mm. For each of these, a semipermeable membrane was formed thereon under the same conditions as those in Example 1. An observation of the surface of the semipermeable membrane and an observation by light transmission about the thickness of the semipermeable membrane were carried out, and as a result, no coating defect was detected.

<Conclusions>

The wet-laid nonwoven fabric for a semipermeable membrane supporting body thus obtained did not satisfy the condition 2, but satisfied the condition 1. Thus, the nonwoven fabric was determined to be free of problems at a practical level. Furthermore, it was confirmed that the wet-laid nonwoven fabric for a semipermeable membrane supporting body had no low density defect.

Example 6

<Hot Press Processing>

The nonwoven fabric roll A of Example 1 was subjected to hot press processing under the same conditions as those in Example 1, by using the heat calender apparatus having a chipped metal roll used in Example 2. Thus, a wound roll having a basis weight of 75 g/m², a thickness of 95 μm, a sheet density of 0.79 g/cm³, and a pressure loss of 350 Pa was obtained. Next, this wound roll was subjected to hot press processing under the conditions of a roll surface temperature of 195° C., which was higher by 15° C. than the hot pressing temperature of the first treatment, a clearance between rolls of 0 μm, a linear pressure of 150 kN/m, and a throughput speed of 5 m/min, by using the same soft nip heat calender apparatus equipped with a combination of a metal roll and a cotton roll as that used in Example 5. Thus, a wet-laid nonwoven fabric F for a semipermeable membrane supporting body having a basis weight of 76 g/m², a thickness of 91 μm, a sheet density of 0.84 g/cm³, and a pressure loss of 450 Pa was obtained. When visually inspected, no low density defect was detected.

<Solid Printing Evaluation 1>

A specimen having a width of 900 mm and a length of 1800 mm was collected from the foregoing wet-laid nonwoven fabric F for a semipermeable membrane supporting body, and this specimen was divided into 18 pieces having a size of a width of 300 mm and a length of 300 mm. Each of these was subjected to solid printing by using an RI tester and a printing ink. As a result, no spot was detected in all of the 18 sheets.

<Solid Printing Evaluation 2>

A specimen having a width of 900 mm and a length of 1800 mm was collected from the foregoing wet-laid nonwoven fabric F for a semipermeable membrane supporting body, and this specimen was directly subjected to solid printing with an inkjet printer. As a result, no spot was detected.

<Coating Evaluation>

A specimen having a width of 900 mm and a length of 1800 mm was collected from the foregoing wet-laid nonwoven fabric F for a semipermeable membrane supporting body, and this specimen was divided into 18 pieces having a size of a width of 300 mm and a length of 300 mm. For each of these, a semipermeable membrane was formed thereon under the same conditions as those in Example 1. An observation of the surface of the semipermeable membrane and an observation by light transmission about the thickness of the semipermeable membrane were carried out, and as a result, no coating defect was detected.

<Conclusions>

The wet-laid nonwoven fabric for a semipermeable membrane supporting body thus obtained satisfied the condition 1 or the condition 2, and was determined to be free of problems at a practical level. Also, it was confirmed that the wet-laid nonwoven fabric for a semipermeable membrane supporting body had no low density defect.

Example 7

<Hot Press Processing>

The nonwoven fabric roll A of Example 1 was subjected to hot press processing under the same conditions as those in Example 1, by using the heat calender apparatus having a chipped metal roll used in Example 2. Thus, a wound roll having a basis weight of 75 g/m², a thickness of 94 μm, a sheet density of 0.80 g/cm³, and a pressure loss of 390 Pa was obtained. Next, this wound roll was subjected to hot press processing under the conditions of a roll surface temperature of 200° C., which was higher by 20° C. than the hot pressing temperature of the first treatment, a clearance between rolls of 0 μm, a linear pressure of 150 kN/m, and a throughput speed of 5 m/min, by using the same soft nip heat calender apparatus equipped with a combination of a metal roll and a cotton roll as that used in Example 5. Thus, a wet-laid nonwoven fabric G for a semipermeable membrane supporting body having a basis weight of 78 g/m², a thickness of 94 μm, a sheet density of 0.83 g/cm³, and a pressure loss of 470 Pa was obtained. When visually inspected, no low density defect was detected.

<Solid Printing Evaluation 1>

A specimen having a width of 900 mm and a length of 1800 mm was collected from the foregoing wet-laid nonwoven fabric G for a semipermeable membrane supporting body, and this specimen was divided into 18 pieces having a size of a width of 300 mm and a length of 300 mm. Each of these was subjected to solid printing by using an RI tester and a printing ink. As a result, no spot was detected in all of the 18 sheets.

<Solid Printing Evaluation 2>

A specimen having a width of 900 mm and a length of 1800 mm was collected from the foregoing wet-laid nonwoven fabric G for a semipermeable membrane supporting body, and this specimen was directly subjected to solid printing with an inkjet printer. As a result, no spot was detected.

<Coating Evaluation>

A specimen having a width of 900 mm and a length of 1800 mm was collected from the foregoing wet-laid nonwoven fabric G for a semipermeable membrane supporting body, and this specimen was divided into 18 pieces having a size of a width of 300 mm and a length of 300 mm. For each of these, a semipermeable membrane was formed thereon under the same conditions as those in Example 1. An observation of the surface of the semipermeable membrane and an observation by light transmission about the thickness of the semipermeable membrane were carried out, and as a result, no coating defect was detected.

<Conclusions>

The wet-laid nonwoven fabric for a semipermeable membrane supporting body thus obtained satisfied the condition 1 or the condition 2, and was determined to be free of problems at a practical level. Also, it was confirmed that the wet-laid nonwoven fabric for a semipermeable membrane supporting body had no low density defect.

Example 8

<Hot Press Processing>

The nonwoven fabric roll A of Example 1 was subjected to hot press processing under the same conditions as those in Example 1, by using the heat calender apparatus having a chipped metal roll used in Example 2. Thus, a wound roll having a basis weight of 74 g/m², a thickness of 94 μm, a sheet density of 0.79 g/cm³, and a pressure loss of 350 Pa was obtained. Next, this wound roll was subjected to hot press processing under the conditions of a roll surface temperature of 180° C., which was the same as the hot pressing temperature of the first treatment, a clearance between rolls of 0 μm, a linear pressure of 150 kN/m, and a throughput speed of 5 m/min, by using the same soft nip heat calender apparatus equipped with a combination of a metal roll and a cotton roll as that used in Example 5. Thus, a wet-laid nonwoven fabric H for a semipermeable membrane supporting body having a basis weight of 75 g/m², a thickness of 93 μm, a sheet density of 0.81 g/cm³, and a pressure loss of 410 Pa was obtained. When visually inspected, no low density defect was detected.

<Solid Printing Evaluation 1>

A specimen having a width of 900 mm and a length of 1800 mm was collected from the foregoing wet-laid nonwoven fabric H for a semipermeable membrane supporting body, and this specimen was divided into 18 pieces having a size of a width of 300 mm and a length of 300 mm. Each of these was subjected to solid printing by using the same RI tester and the same printing ink as those used in Example 1. As a result, two spots were detected from the 18 sheets. Here, two sheets each having one spot were detected. Regarding the spots, the two spots were all at the same positions in the sheet width direction before being divided, and the distance between the two spots in the sheet length direction before being divided was 1412 mm, which almost coincided with the circumference of the calender roll.

<Solid Printing Evaluation 2>

A specimen having a width of 900 mm and a length of 1800 mm was collected from the foregoing wet-laid nonwoven fabric H for a semipermeable membrane supporting body, and this specimen was directly subjected to solid printing with the same inkjet printer as that used in Example 1. As a result, two spots were detected in the sheet. Regarding the spots, the two spots were all at the same positions in the sheet width direction, and the distance in the sheet length direction was 1412 mm, which almost coincided with the circumference of the calender roll. Furthermore, the position of the depression in the width direction of the calender roll coincided with the position of the spot in the sheet width direction.

<Coating Evaluation>

A specimen having a width of 900 mm and a length of 1800 mm was collected from the foregoing wet-laid nonwoven fabric H for a semipermeable membrane supporting body, and this specimen was divided into 18 pieces having a size of a width of 300 mm and a length of 300 mm. For each of these, a semipermeable membrane was formed thereon by the same method as that used in Example 1. An observation of the surface of the semipermeable membrane and an observation by light transmission about the thickness of the semipermeable membrane were carried out, and as a result, a coating defect of having a thinner coating layer was detected in two of the 18 sheets at the same position in the sheet width direction. The position of the depression in the width direction of the calender roll coincided with the position of the coating defect in the sheet width direction before being divided, and the distance in the sheet length direction was 1411 mm, which almost coincided with the circumference of the calender roll. Furthermore, the semipermeable membrane was peeled off, and normal areas and coating defect areas were observed under an electron microscope. As a result, it was observed that dissolution of the synthetic fiber was poorer in the coating defect areas than in the normal areas. Thus, it was confirmed that these areas corresponded to the low density defects.

<Conclusions>

The wet-laid nonwoven fabric for a semipermeable membrane supporting body thus obtained did not satisfy the condition 1 or the condition 2, and therefore, the nonwoven fabric was determined to have problems at a practical level. It was confirmed that the wet-laid nonwoven fabric for a semipermeable membrane supporting body had low density defects.

Example 9

<Hot Press Processing>

The metal roll of the soft nip heat calender apparatus equipped with a combination of a metal roll and a cotton roll used in Example 5 was replaced with a metal roll having a depression with a diameter of about 1 mm and a depth of about 0.6 mm at one site on the roll surface, and the aforementioned nonwoven fabric roll A was subjected to hot press processing under the conditions of a roll surface temperature of 180° C., a clearance between rolls of 0 μm, a linear pressure of 150 kN/m, and a throughput speed of 5 m/min. Thus, a wound roll having a basis weight of 75 g/m$^2$, a thickness of 98 μm, a sheet density of 0.77 g/cm$^3$, and a pressure loss of 310 Pa was obtained. Next, the metal roll of this heat calender was replaced again with a metal roll having no chip on the roll surface, and the foregoing wound roll was subjected to hot press processing on the reverse side of the sheet that was brought into contact with the metal roll during the first treatment, under the conditions of a roll surface temperature of 200° C., which was higher by 20° C. than the hot pressing temperature of the first treatment, a clearance between rolls of 0 μm, a linear pressure of 150 kN/m, and a throughput speed of 5 m/min. Thus, a wet-laid nonwoven fabric I for a semipermeable membrane supporting body having a basis weight of 78 g/m$^2$, a thickness of 95 μm, a sheet density of 0.82 g/cm$^3$, and a pressure loss of 420 Pa was obtained. When visually inspected, no low density defect was detected.

<Solid Printing Evaluation 1>

A specimen having a width of 900 mm and a length of 1800 mm was collected from the foregoing wet-laid nonwoven fabric I for a semipermeable membrane supporting body, and this specimen was divided into 18 pieces having a size of a width of 300 mm and a length of 300 mm. Each of these was subjected to solid printing by using the same RI tester and the same printing ink as those used in Example 1. As a result, two spots were detected from the 18 sheets. Here, two sheets each having one spot were detected. Regarding the spots, the two spots were all at the same positions in the sheet width direction before being divided, and the distance between the two spots in the sheet length direction before being divided was 1413 mm, which almost coincided with the circumference of the calender roll.

<Solid Printing Evaluation 2>

A specimen having a width of 900 mm and a length of 1800 mm was collected from the foregoing wet-laid nonwoven fabric I for a semipermeable membrane supporting body, and this specimen was directly subjected to solid printing with the same inkjet printer as that used in Example 1. As a result, two spots were detected in the sheet. Regarding the spots, the two spots were all at the same positions in the sheet width direction, and the distance in the sheet length direction was 1413 mm, which almost coincided with the circumference of the calender roll. Furthermore, the position of the depression in the width direction of the calender roll coincided with the position of the spot in the sheet width direction.

<Coating Evaluation>

A specimen having a width of 900 mm and a length of 1800 mm was collected from the foregoing wet-laid nonwoven fabric I for a semipermeable membrane supporting body, and this specimen was divided into 18 pieces having a size of a width of 300 mm and a length of 300 mm. For each of these, a semipermeable membrane was formed thereon by the same method as that used in Example 1. An observation of the surface of the semipermeable membrane and an observation by light transmission about the thickness of the semipermeable membrane were carried out, and as a result, a coating defect of having a thinner coating layer was detected in two of the 18 sheets at the same position in the sheet width direction. The position of the depression in the width direction of the calender roll coincided with the position of the coating defect in the sheet width direction before being divided, and the distance in the sheet length direction was 1412 mm, which almost coincided with the circumference of the calender roll. Furthermore, the semipermeable membrane was peeled off, and normal areas and coating defect areas were observed under an electron microscope. As a result, it was observed that dissolution of the synthetic fiber was poorer in the coating defect areas than in the normal areas. Thus, it was confirmed that these areas corresponded to the low density defects.

<Conclusions>

The wet-laid nonwoven fabric for a semipermeable membrane supporting body thus obtained did not satisfy the condition 1 or the condition 2, and therefore, the nonwoven fabric was determined to have problems at a practical level. It was confirmed that the wet-laid nonwoven fabric for a semipermeable membrane supporting body had low density defects.

Example 10

<Hot Press Processing>

The nonwoven fabric roll A of Example 1 was subjected to hot press processing under the same conditions as those in Example 1, by using the heat calender apparatus having a chipped metal roll used in Example 2. Thus, a wound roll having a basis weight of 76 g/m$^2$, a thickness of 95 μm, a sheet density of 0.80 g/cm$^3$, and a pressure loss of 360 Pa was obtained. Next, this wound roll was subjected to hot press processing under the conditions of a roll surface temperature of 190° C., which was higher by 10° C. than the hot pressing temperature of the first treatment, a clearance between rolls of 80 μm, a linear pressure of 90 kN/m, and a throughput speed of 5 m/min, by using the same heat calender apparatus. Thus, a wet-laid nonwoven fabric J for a semipermeable membrane supporting body having a basis weight of 79 g/m$^2$, a thickness of 95 μm, a sheet density of 0.83 g/cm$^3$, and a pressure loss of 450 Pa was obtained. When visually inspected, no low density defect was detected.

<Solid Printing Evaluation 1>

A specimen having a width of 900 mm and a length of 1800 mm was collected from the foregoing wet-laid nonwoven fabric J for a semipermeable membrane supporting body, and this specimen was divided into 18 pieces having a size of a width of 300 mm and a length of 300 mm. Each of these was subjected to solid printing by using an RI tester and a printing ink. As a result, no spot was detected in all of the 18 sheets.

<Solid Printing Evaluation 2>

A specimen having a width of 900 mm and a length of 1800 mm was collected from the foregoing wet-laid nonwoven fabric J for a semipermeable membrane supporting body, and this specimen was directly subjected to solid printing with an inkjet printer. As a result, no spot was detected.

<Coating Evaluation>

A specimen having a width of 900 mm and a length of 1800 mm was collected from the foregoing wet-laid nonwoven fabric J for a semipermeable membrane supporting body, and this specimen was divided into 18 pieces having a size of a width of 300 mm and a length of 300 mm. For each of these, a semipermeable membrane was formed thereon under the same conditions as those in Example 1. An observation of the surface of the semipermeable membrane and an observation by light transmission about the thickness of the semipermeable membrane were carried out, and as a result, no coating defect was detected.

<Conclusions>

The wet-laid nonwoven fabric for a semipermeable membrane supporting body thus obtained satisfied the condition 1 or the condition 2. Thus, the nonwoven fabric was determined to be free of problems at a practical level. Furthermore, it was confirmed that the wet-laid nonwoven fabric for a semipermeable membrane supporting body had no low density defect.

The test for pressure loss of the Examples was carried out as follows.

<Pressure Loss>

The pressure loss obtainable when a filter material having an effective area of 100 cm$^2$ was aerated at a face velocity of 5.3 cm/sec by using a self-made apparatus, was measured with a fine pressure difference meter.

What is claimed is:

1. A method for producing a wet-laid nonwoven fabric for a semipermeable membrane supporting body, the method comprising:

performing papermaking according to a wet papermaking method by using a fiber slurry containing a synthetic fiber as a main constituent fiber;

drying the fiber slurry to form a dried sheet;

subsequently subjecting the dried sheet to hot press processing a first time and a second time by using a heat calender apparatus, wherein the hot press processing at the second time is at a temperature that is higher by 10° C. or more than the hot press processing at the first time, wherein the heat calender apparatus used for hot press processing during the first time and the second time is a hard nip heat calender apparatus in which the metal rolls are arranged in four or more stages along a height direction of the hard nip heat calender apparatus;

thereby obtaining a wet-laid nonwoven fabric for a semipermeable membrane supporting body; and determining whether the wet-laid nonwoven fabric for a semipermeable membrane supporting body satisfies at least one of a first condition or a second condition by extracting one or more samples, wherein the first condition is that spots where a printing ink does not easily adhere on a printed surface side are not observed when solid printing is carried out with the printing ink over an entire surface of the one or more samples, wherein the second condition is that when the one or more samples have been cut to a size of 210 mm×297 mm and subjected to solid printing over an entire surface with the printing ink, spots where the printing ink does not easily adhere on a printed surface side are not observed in 95% or more of the one or more samples, and using the wet-laid nonwoven fabric on a semipermeable membrane supporting body to which a semipermeable membrane liquid is to be applied if at least one of the first condition or the second condition is satisfied.

* * * * *